United States Patent [19]

Bayer et al.

[11] Patent Number: 4,902,485

[45] Date of Patent: Feb. 20, 1990

[54] PROCESS FOR THE PRODUCTION OF TITANIUM DIOXIDE PIGMENTS

[75] Inventors: Eckhard Bayer; Günter Lailach, both of Krefeld, Fed. Rep. of Germany

[73] Assignee: Bayer Aktiengesellschaft, Leverkusen, Fed. Rep. of Germany

[21] Appl. No.: 275,299

[22] Filed: Nov. 23, 1988

Related U.S. Application Data

[63] Continuation of Ser. No. 78,503, Jul. 28, 1987, abandoned.

[30] Foreign Application Priority Data

Aug. 14, 1986 [DE] Fed. Rep. of Germany ....... 3627655

[51] Int. Cl.$^4$ .............................................. C01G 23/04
[52] U.S. Cl. ........................................ 423/82; 423/85; 423/610; 423/615; 423/616
[58] Field of Search ................... 423/82, 610, 85, 615, 423/616; 501/134

[56] References Cited

U.S. PATENT DOCUMENTS

| | | | |
|---|---|---|---|
| 3,105,144 | 10/1963 | Luethge | 423/610 |
| 3,211,538 | 10/1965 | Gross et al. | 423/147 |
| 3,848,860 | 11/1974 | Maeda et al. | 266/155 |
| 3,868,441 | 2/1975 | Agee et al. | 423/69 |
| 4,663,131 | 5/1987 | Gerken et al. | 423/82 |

FOREIGN PATENT DOCUMENTS 0097259 4/1984 European Pat. Off. .............. 423/82

*Primary Examiner*—John Doll
*Assistant Examiner*—Paige C. Harvey
*Attorney, Agent, or Firm*—Sprung Horn Kramer & Woods

[57] ABSTRACT

A process for the production of $TiO_2$ pigments by the sulfate process by digestion of titanium-containing raw materials with sulfuric acid, hydrolysis of the titanyl sulfate formed, purification of the hydrolyzate and calcination of the hydrolyzate in rotary kilns, wherein the calcination conditions are regulated through adjustment of the $SO_2$ content of the waste gases issuing from the rotary kilns used for calcination.

The calcination offgases can be partially returned to the combustion chambers of the kilns and the calcination conditions regulated through adjustment of the $SO_2$ content of the calcination offgases.

7 Claims, No Drawings

PROCESS FOR THE PRODUCTION OF TITANIUM DIOXIDE PIGMENTS

This is a continuation of application Ser. No. 07/078,503, filed July 28, 1987 now abandoned.

This invention relates to a process for the production of $TiO_2$ pigments by the sulfate process by digestion of titanium-containing raw materials with sulfuric acid, hydrolysis of the titanyl sulfate formed, purification of the hydrolyzate and calcination of the purified hydrolyzate in rotary kilns.

BACKGROUND OF THE INVENTION

According to the prior art (U.S. Pat. No. 3,105,744), calcination of the purified hydrolyzate obtained by the sulfate process is carried out primarily in rotary kilns where product temperatures of from 800° to 1100° C. are reached. Heating of the rotary kilns is by fuel oil or fuel gas and involves high energy consumption.

The hydrolyzate normally contains 7-9% by weight $H_2SO_4$, based on $TiO_2$, as an unwanted secondary constituent. $SO_2$ and $SO_3$ are formed therefrom during the calcination step, $H_2SO_4$ being formed by reaction of the $SO_3$ with steam. In addition to steam, nitrogen, oxygen, carbon dioxide and dust, therefore, the offgases issuing from the kilns used for calcination also contain $SO_2$ and $SO_3$ or $H_2SO_4$.

The properties of the $TiO_2$ pigments, particularly the relative content of the two modifications, anatase and rutile, and also the particle size of the pigment crystals depend to a large extent upon the calcination conditions.

The addition of excess air (secondary air) to the smoke gases formed during combustion of the fuels promotes the development of a certain temperature profile in the rotary kiln which is optimal for the particular product. To monitor this optimal temperature profile and, hence, the calcination conditions, the product temperatures of the $TiO_2$ pigment formed and/or the gas temperatures in the kiln are normally measured and compared with predetermined ideal values for the particular pigment quality required. In the event of deviations from the preset values, the quantity of fuel and, optionally, the quantity of air is increased or reduced according to requirements.

However, difficulties are involved in accurately measuring the temperatures in the rotary kilns and in keeping them constant.

Accordingly, the calcination conditions always have to be readjusted whenever deviations from the desired quality are detected during the examination of pigment samples.

On account of the relatively long time interval between sampling and readjustment of the calcination conditions, variations in the quality of the $TiO_2$ pigment discharged from the kiln are unavoidable.

Even in cases where the offgases issuing from the rotary kilns used for calcination are partly recycled to the combustion chambers (U.S. Pat. No. 3,105,744), variations in the quality of the $TiO_2$ pigment are unavoidable on account of the inertia of the described method of controlling the calcination conditions.

In addition, the $SO_2$ content of the offgases is subject to considerable variation in this process, giving rise to problems in the now necessary removal of the $SO_2$ content of the calcination offgases which are released into the atmosphere.

DESCRIPTION OF THE INVENTION

The object of the present invention is to provide a particularly advantageous process for the production of $TiO_2$ pigments which does not have any of the disadvantages described above.

It has now surprisingly been found that the calcination conditions can be regulated through adjustment of the $SO_2$ content of the offgases issuing from the rotary kilns used for calcination.

Accordingly, the present invention relates to a process for the production of $TiO_2$ pigments by the sulfate process by digestion of titanium-containing raw materials with sulfuric acid, hydrolysis of the titanyl sulfate formed, purification of the hydrolyzate and calcination of the hydrolyzate in rotary kilns, characterized in that the calcination conditions are regulated through adjustment of the $SO_2$ content of the waste gases issuing from the rotary kilns used for calcination.

The $SO_2$ content of the calcination offgases is preferably kept constant at a value of from 2 to 3.5 $SO_2/m^3$. (The figures for this gas content and all other gas contents mentioned in the following are based on standard conditions).

The optimal $SO_2$ content within the range indicated above depends upon the dimensions of the rotary kiln, the throughput and the required pigment quality.

The present invention also relates to a process for the production of $TiO_2$ pigments by the sulfate process by digestion of titanium-containing raw materials with sulfuric acid, hydrolysis of the titanyl sulfate formed, purification of the hydrolyzate and calcination of the purified hydrolyzate in rotary kilns, characterized in that the calcination offgases are partially returned to the combustion chambers of the kilns and the calcination conditions are regulated through adjustment of the $SO_2$ content of the calcination offgases.

To this end, the calcination conditions—in one embodiment of the process—are selected so that the $SO_2$ content of the calcination offgases remains constant at a value of from 4 to 8 g $SO_2/m^3$.

The $SO_2$ content is preferably kept constant at a value of from 4 to 7 g $SO_2/m^3$.

The $SO_2$ content is preferably controlled through the supply of fuel to the combustion chambers. In other words, in the event of a reduction in the $SO_2$ content of the calcination offgases below the particular optimal value, the supply of fuel is increased and, if the optimal value is exceeded, is reduced. However, the $SO_2$ content may also be controlled through other parameters, such as for example the quantity of secondary air, in which case the secondary air may consist according to the invention of recycled calcination offgases.

According to the invention, the secondary air is partly or, preferably, completely replaced by recycled calcination offgases. The optimal value depends upon the technical parameters of the rotary kilns, the product throughput, the required product quality and the temperature and quantity of the recycled offgases. In one preferred embodiment of the process according to the invention, the calcination offgases are freed from dust before they are returned to the combustion chambers and the dust separated off is fed into the rotary kilns together with the hydrolyzate.

In one advantageous variant of the process according to the invention, the hot (300°-500° C.) dust-containing calcination offgases are cooled to 200°-250° C. in a waste heat boiler to generate steam, freed from dust and then partly fed instead of secondary air into the combustion chambers of the rotary kilns.

If the oxygen content of the calcination offgases is above 5% by volume, it is of advantage to replace part of the primary air required for combustion of the fuels by the hot, dust-free calcination offgases.

By applying the process according to the invention, the operating conditions of the rotary kiln may be regulated virtually without delay. The calcination conditions may thus be optimized and variations in product quality avoided.

Where the calcination offgases are returned to the combustion chambers, up to 50% of the total quantity of calcination offgases may be recycled without any reduction in product quality and up to 30% of the energy required in the absence of recycling of the offgases may be saved.

In addition, by maintaining a substantially constant $SO_2$ content in the calcination offgases, the plant required for the removal of $SO_2$ may be given more favorable dimensions and lends itself to more constant operation than in the case of highly fluctuating $SO_2$ contents of the calcination offgases, as obtained in the prior art.

The process according to the invention and its advantages are illustrated by the following Examples.

COMPARISON EXAMPLE

In a rotary kiln heated by natural gas, rutile pigment is produced by calcination of titanium oxide hydrate fitler cakes to which rutilization nuclei, alkali and mineralizers have been added. The critical parameter selected for obtaining a certain pigment quality (desired value: rutilization 99–100%) was the product temperature $T_1$ shortly before discharge of the rutile pigment from the kiln. The temperature profile over the length of the kiln was adjusted by addition of secondary air (60° C.). The quantity of natural gas was controlled with the product temperature $T_1$ as controlled variable. The desired value for $T_1$ should be in the range of 935°–940° C. to obtain optimal pigment quality. On account of the problems involved in measuring product temperature in the rotary kiln and the significant influence of the temperature on pigment quality, the desired value of $T_1$ always had to be changed whenever the properties of the examined pigment samples deviated from the standard values. The desired temperature was effectively varied between 915° and 980° C. The degree of rutilization varied from 98 to 100%, but occasionally fell to 90%. The tinting power varied accordingly from 580 to 680 and the grey tinge from 2.3 to 4.8. For a throughput of 4.7 t $TiO_2$/h, the consumption of natural gas was 1380 m$^3$/h, corresponding to a specific natural gas consumption of 294 m$^3$/t $TiO_2$.

The $SO_2$ content in the kiln offgases varied from 1.7 to 4.3 g/m$^3$.

EXAMPLE 1

In the production of rutile pigment in accordance with the Comparison Example, the $SO_2$ content of the kiln offgases was continuously measured. The ideal value for the product temperature $T_1$ was not adjusted as a function of deviations in the product sample quality from the standard sample quality (of which the determination involves a certain delay), but instead was adjusted in such a way that the $SO_2$ content in the kiln offgases was kept at 2.8±0.2 g/m$^3$. As a result of this novel process control, there were only minor variations in temperature (940±10° C.) and the product quality was considerably more uniform than that obtained by the conventional method of control. The degree of rutilization was between 99.4 and 99.8%, the tinting power between 645 and 660 and the grey tinge between 3.3 and 3.5.

In addition, the consumption of natural gas for a throughput of 4.7 t $TiO_2$/h was only 1285 m$^3$/h, corresponding to a specific natural gas consumption of 273 m$^3$/t $TiO_2$.

EXAMPLE 2

In the calcination process according to Example 1, the secondary air (temperature approx. 60° C.) was replaced by hot kiln offgases (temperature 380°–450° C.) to save energy.

To this end, 20% of the offgases were returned to the combustion chamber after the removal of dust. Since $SO_2$ was also recycled with the calcination offgases, a value of 3.8 g/m$^3$ was calculated as the optimal $SO_2$ content of the kiln offgases under these operating conditions. However, at 940°–950° C. and with approx. 3.8 g $SO_2$/m$^3$ offgas, the degree of rutilization of the pigments obtained was far too low. Attempts to maintain the supposedly optimal $SO_2$ content and to match product quality with the standard quality resulted in fluctuating $SO_2$ contents and in highly fluctuating product quality:

| Degree of rutilization | 80–100% |
|---|---|
| Tinting power | 530–680 |
| Grey tinge | 1.8–4.8 |

The specific natural gas consumption was 246 m$^3$/t $TiO_2$.

EXAMPLE 3

Where the kiln used for calcination was operated with recycling of 20% of the offgases to the combustion chamber instead of introducing secondary air, it was only possible to establish a stationary operational state with optimal product quality and a minimal natural gas consumption when the product temperature $T_1$ was adjusted at 980±10° C. in such a way that the $SO_2$ content of the kiln offgases was between 4.9 and 5.2 g/m$^3$ (and hence far above the expected value). For a throughput of 4.8 t/h, stable furnace operation and uniform product quality were obtained:

| Degree of rutilization | 99.5–99.9% |
|---|---|
| Tinting power | 675–690 |
| Grey tinge | 3.3–3.5 |

The specific natural gas consumption was only 226 m$^3$/t $TiO_2$.

What is claimed is:

1. In a process for the production of TiO2 pigments by the sulfate process comprising digestion of titanium-containing raw materials with sulfuric acid, hydrolysis of the titanyl sulfate formed, purification of the hydrolyzate and calcination of the purified hydrolyzate in rotary kilns, the improvement comprising measuring the $SO_2$-content of the calcination off-gases and adjusting the $SO_2$ content of the calcination offgases issuing from the rotary kilns used for calcination to a constant value said constant value being from 2 to 3.5 g $SO_2$/m$^3$ or from 4 to 8 g $SO_2$/m$^3$.

2. A process according to claim 1, wherein the calcination offgases are partly recycled to combustion chambers of the kilns.

3. A process according to claim 2, wherein the $SO_2$ content of the calcination offgases is kept constant at a value of from 4 to 8 g $SO_2/m^3$.

4. A process according to claim 2, wherein the $SO_2$ content of the calcination offgases is kept constant at a value of from 4 to 7 g $SO_2/m^3$.

5. A process according to claim 1, wherein the SO2 content of the calcination offgases is controlled through the supply of fuel to combustion chambers of the kilns.

6. A process according to claim 2, wherein the calcination offgases are freed from dust before recycling to combustion chambers of the kilns and the dust separated off is fed together with the hydrolyzate into the rotary kilns.

7. A process according to claim 2, wherein the calcination offgases are cooled to 200°–300° C. in waste heat boilers to generate steam, subsequently freed from dust and partly recycled to combustion chambers of the rotary kilns.

* * * * *